United States Patent [19]
Turner

[11] Patent Number: 4,744,504
[45] Date of Patent: * May 17, 1988

[54] METHOD OF MANUFACTURING A CLAD TUBULAR PRODUCT BY EXTRUSION

[76] Inventor: William C. Turner, 85 Pinto La., Sedona, Ariz. 86336

[ * ] Notice: The portion of the term of this patent subsequent to Nov. 4, 2003 has been disclaimed.

[21] Appl. No.: 920,598

[22] Filed: Oct. 20, 1986

Related U.S. Application Data

[63] Continuation-in-part of Ser. No. 694,347, Jan. 2, 1985, Pat. No. 4,620,660.

[51] Int. Cl.⁴ .............................................. B23K 1/00
[52] U.S. Cl. ................................. 228/127; 228/156; 228/186; 228/219
[58] Field of Search ............... 228/131, 127, 132, 219, 228/156, 158, 186, 221, 265

[56] References Cited

U.S. PATENT DOCUMENTS

| | | | |
|---|---|---|---|
| 3,121,949 | 2/1964 | Wright | 228/186 |
| 3,963,162 | 6/1976 | Taguchi | 228/134 |
| 4,367,838 | 1/1983 | Yoshida | 228/156 |
| 4,604,785 | 8/1986 | Eddens | 228/156 |

FOREIGN PATENT DOCUMENTS

| | | | |
|---|---|---|---|
| 197608 | 2/1975 | Japan | 228/132 |
| 0100890 | 8/1980 | Japan | 228/186 |

Primary Examiner—Kurt Rowan
Attorney, Agent, or Firm—Head & Johnson

[57] ABSTRACT

A method of manufacturing an internally clad tubular product employing a cylindrical host formed such as of a first nickel base alloy including the steps of plating the internal surface of the host with a low melting point bonding metal alloy, inserting a cylindrical cladding member, such as of a second nickel base alloy, into the plated cylindrical host, circumferentially welding one end of the cladding member to one end of the host member directly and welding the other ends in such a manner as to incorporate a metallic gas reservoir, thus forming a subassembly, evacuating the annular space formed in the subassembly between the exterior of the cladding member and the interior of the cylindrical host of water vapor and oxygen, heating the subassembly to about 1650° to 2200° F. thereby melting the bonding metal alloy, and hot extruding the heated subassembly to metallically bond the cladding member to the cylindrical host by means of the mechanism of liquid interface diffusion bonding.

18 Claims, 2 Drawing Sheets

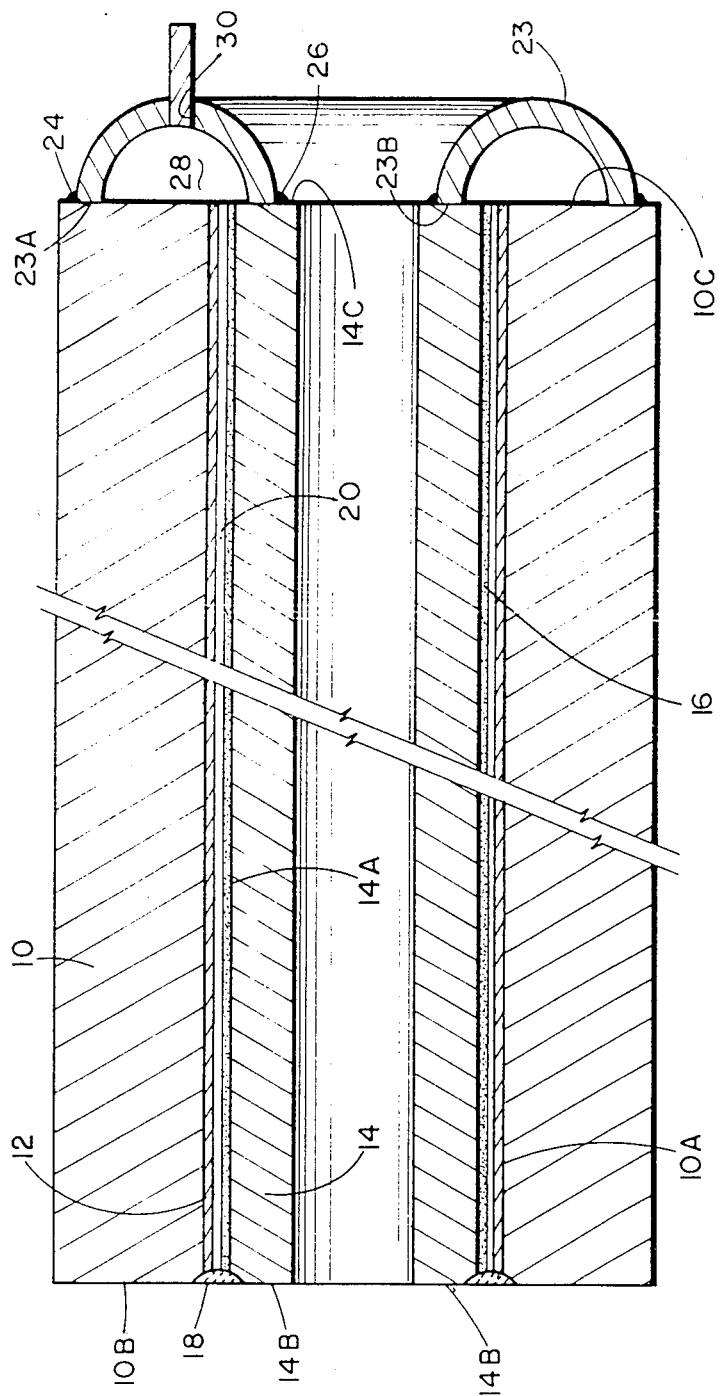

METHOD OF MANUFACTURING A CLAD TUBULAR PRODUCT BY EXTRUSION

CROSS-REFERENCE TO RELATED APPLICATION

This is a continuation-in-part of application Ser. No. 694,347 filed Jan. 2, 1985 now U.S. Pat. No. 4,620,660 entitled: "Method of Manufacturing an Internally Clad Tubular Product".

SUMMARY OF THE DISCLOSURE

The present invention is directed towards a method of manufacturing a clad tubular product. There exists in industry a need for tubular products in which one surface is formed of a material which is extremely resistive to corrosive materials, including fluids and gases. A basic application of the invention is that of internally cladding a tubular steel tube. Another example of a need which currently exists for tubular products having the high temperature strength and/or economy of first nickel base alloy but having the corrosive resistance characteristics of second nickel base alloy or other more expensive materials is that of power plant boiler tubes. Other needs are for downhole and line applications in geothermal wells and high temperature, sour gas wells.

Almost all nickel alloys are a compromise among cost, corrosion resistance and strength (at various temperatures). Better corrosion resistance is virtually always associated with much higher costs. Solid state mechanisms that result in very high strengths are frequently related to reduced corrosion resistance. Nickel substrates are required as substitutes for steel substrates at higher application temperatures.

In order to obtain full advantage of the corrosive resistance characteristics of special nickel materials and the strength and/or economy of other nickel and steel alloys it is necessary that the two metals be metallically bonded. In order to achieve a metallic bond, two metals having very clean surfaces are placed in intimate contact with each other and subjected to a combination of temperature and pressure, with the cleanliness maintained during this step. Metallic bonds have three basic advantages; that is, (a) they are of very high strength, generally the same as the metals being joined; (b) they neither affect nor influence corrosion mechanisms; and (c) they do not act as nucleation sites for cracks that cause fatigue failures.

The present invention provides a method of making clad tubular products which can be accomplished as a part of the normal process for making seamless tubular materials; that is, the method can be practiced with minimal changes in existing modern nickel and steel mills. While the invention relates to basic concepts useful to metallically bond two metals, it will be described as the invention is particularly useful for manufacturing clad tubular products. In the practice of the method of this invention in conjunction with a typical nickel seamless mill, as an example, a tubular host is first formed. This can be achieved in a variety of ways but the typical way in which the subject seamless tubular products are made is by casting cylindrical ingots which are pierced by drilling to form a hollow cylindrical shell. The drilled hole is usually improved by sizing while hot with a mandrel. In the practice of the present invention these hollow cylindrical ingots, which are referred to in this description as cylindrical hosts, are employed to form a subassembly which is subsequently treated to form an internally clad tubular product. The bore will be of necessity of a larger diameter than usual. The first step in forming the subassembly is to plate the internal cylindrical surface of the cylindrical host with a low melting point bonding metal alloy, such as nickel-phosphorus in the composition of about 88 to 98 percent by weight nickel and about 2 to 12 percent by weight phosphorus. This is best achieved by submerging the cylindrical host in an electroless plating bath.

A tubular cladding member, which may be made such as of a second nickel base alloy is next telescopically inserted into the tubular host. This member is a small diameter cast cylinder, turned on OD and pierced by drilling. Other methods to fabricate this detail could be used. A first end of the cladding member is welded about its full circumference to a first one end of the cylindrical host to form the subassembly. Next, the annular space formed in the subassembly between the exterior of the cladding member and the interior of the host is evacuated of water vapor and oxygen. This is achieved by first applying a vacuum to the space followed by filling it with an inert gas, such as argon. Nitrogen may be substituted for argon. This sequence may be repeated as necessary to obtain the condition wherein the water and oxygen dew point in the space is about −60° F. This can best be accomplished by welding a circumferential bag member between the second end of the tubular host and the second end of the tubular cladding member. The circumferential bag member has a small diameter opening therein providing means of evacuating the annular space and filling it with inert gas in the sequence necessary to rid the space of all substantial water and oxygen.

In some instances, depending upon the materials and the temperatures and the pressures employed in subsequent steps, it may be desirable to include a flux material between the plated internal surface of the tubular host and the external surface of the cladding member. This can be accomplished by coating the external surface of the cladding member with a flux before it is inserted into the tubular host.

The subassembly with the inert gas in the annular space is then heated to a temperature sufficient to melt the bonding metal alloy which should be between about 1650° F. and 2200° F. While at such temperature the subassembly is hot extruded into tubing, concurrently metallically bonding the cladding member to the cylindrical host.

The gas bag not only aids pump down but also provides a reservoir for the gases and excess bonding metal as displaced during hot extrusion. The sealed condition of the faying surfaces is required to prevent contamination during this extrusion step, as well as during heating in the furnace.

The bonding metal is required to achieve liquid interface diffusion bonding (LIDB). LIDB is required in order to affect metallic bonding within the temperature, pressure and time parameters of hot extrusion. The melting point and reaction rates of the bonding metal are directly related to the exact composition of the bonding metal. The temperature and pressure of extruding is empirically determined so as to eliminate the gap between the host and cladding material without damage of and undue stress to, either material. The exact composition of the bonding metal is selected to suit these developed temperatures, pressures and extruding rates. All voids at the interface must be avoided.

After the metallic bond has been completed the product is run through a usual reduction step as is typical in the manufacture of seamless tubular products to obtain a preselected ID and OD. The internally clad tubular product is then cut to length, and straightened, more or less as the standard seamless tubular product is handled in todays modern mill process. Any customary heat treating would also be performed.

This invention further discloses a modified bag used in forming a subassembly in the method of cladding a tubular member by extrusion.

DESCRIPTION OF THE DRAWING

FIG. 2 is a fragmentary cross-sectional view as employed in the method of manufacturing internally clad tubular products as in FIG. 1, but showing the use of a modified bag in forming the subassembly by extrusion.

DESCRIPTION OF THE PREFERRED EMBODIMENT OF THE INVENTION

Figure 1:
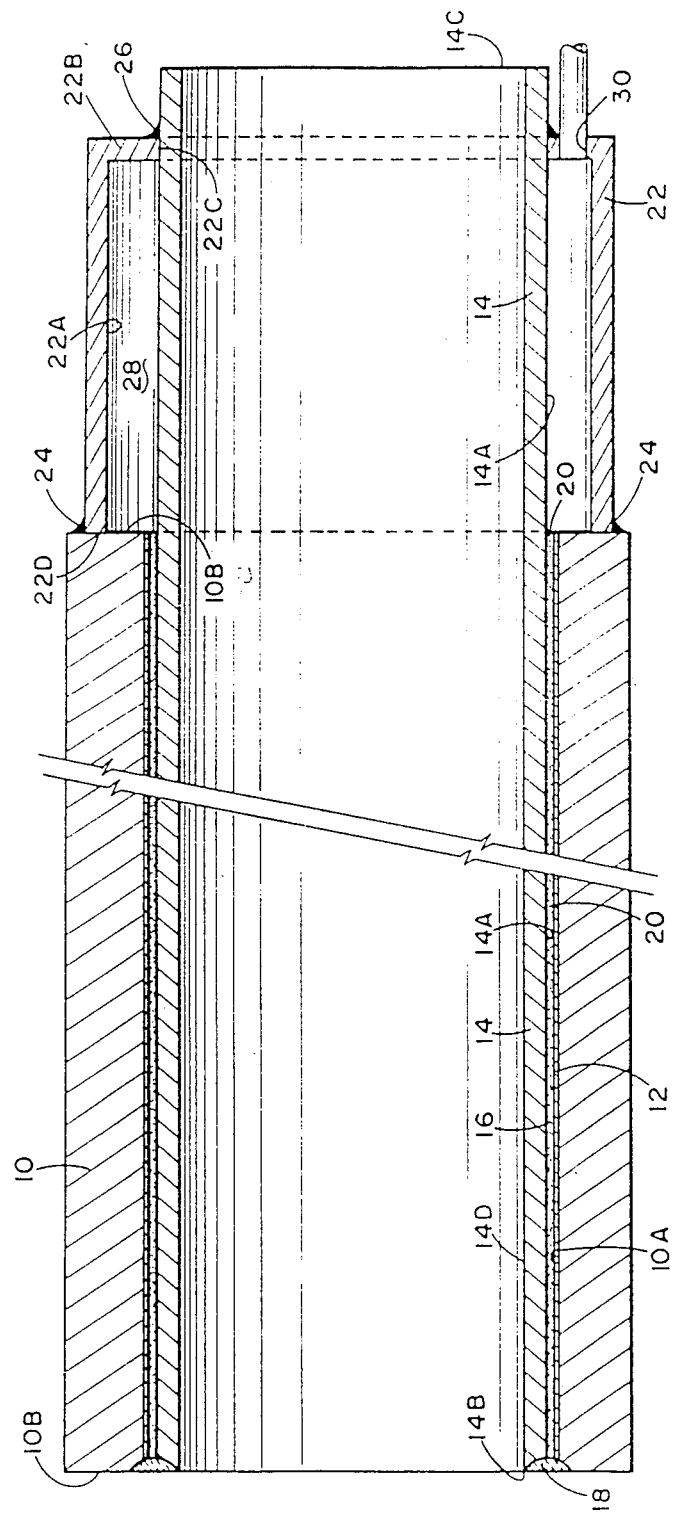
FIG. 1 is a fragmentary cross-sectional view of a subassembly as employed in the method of manufacturing internally clad tubular products showing the stage in the process in which the subassembly is ready to be heated and hot rolled in a mill.

While the invention may be practiced in other ways, it will be briefly described as it is particularly applicable to the manufacture of internally clad tubular products in conjunction with the well known method of manufacturing seamless tubing in a nickel mill. In a nickel mill seamless tubing is manufactured by first producing by casting a solid cylindrical billet. The billet is then longitudinally pierced by drilling to form a hollow shell. The drilled hole is mandrel sized. This hollow shell is heated and hot extruded in a horizontal hydraulic press thus forming what is referred to as "mother" pipe. The mother pipe is, while either still heated or cooled down, formed to the required diameters by stretch reducing.

The basic invention starts with the round steel billet after it has been pierced to produced a hollow shell which forms a cylindrical host. In some manufacturing processes the billet is "pierced" twice and in this case the hollow shell or host product will be employed after the second "piercing".

Referring to FIG. 1, the hollow tubular host is indicated by the numeral 10 and is typically formed of steel having the prescribed composition according to the ultimate intended use of the tubular product. The tubular host is of diameter greater than the ultimate diameter of the tubular product and of length much less than the ultimate length of the finished tubular product. In addition, the wall thickness is much greater than will be found in the finished product.

The tubular host 10 is removed from the standard production process and the internal surface 10A is plated with a layer of a low melting point bonding metal alloy 12. This is best achieved by submerging the tubular host 10 in a cleaning bath followed by an electroless plating bath.

The low melting point bonding metal alloy may be nickel phosphorus, nickel boron, nickel chromium phosphorus, chromium phosphorus or mixtures of these alloys. A preferred alloy is nickel phosphorus composed of about 88 to 98 percent by weight nickel and about 2 to 12 percent by weight phosphorus. In some instances, an additional wetting aid is helpful and in such cases about 0.5 to 1 percent by weight boron may be employed in the plating alloy. The depth of the plating is not critical but may be to a thickness of about 0.0005 to about 0.002 inches. The exact composition and thickness will be determined by the hot rolling parameters.

A tubular cladding member 14 is next telescopically inserted into the plated host member 10. The tubing cladding member 14 has an external diameter 14A which is slightly less than the internal diameter 10A of the tubular host so that the cladding member slides freely into position within the host. In some instances it is desirable that a flux be employed, and if so, the flux will probably be applied to the external cylindrical surface 14A of the tubular cladding member. While other flux materials may be utilized a preferred material is cryolite.

The metallurgical terminology surfaces to be metallically joined are called "faying" surfaces. Thus, in the embodiment of this invention, as illustrated and described, the host cylindrical, internal surface 10A with the bonding metal alloy 12 plated thereon is one faying surface and the exterior surface 14A of the tubular cladding member, with or without a flux 16 thereon, is the other faying surface.

After insertion of the tubular cladding member 14 the first end 14B is welded to the host member 10 adjacent its first end 10B. The welding 18 is around the full circumference of the cladding member 14 and the host member 10B to form an airtight seal. The welding 18 does not have to be accomplished exactly at the end of the cladding member 14, that is, the cladding member 14 would probably extend somewhat beyond the end 10B of the host member. The essence of the welding step is to seal one end of an annular space 20 between the internal surface 10A of the host member and the exterior 14A of the cladding member, which annular space is closed at the other end by welding so as to incorporate the gas reservoir and seal the faying surfaces. The weld at the first end will also be structural and will transfer stresses between the two cylinders during rolling.

The next step is to remove from the annular space 20 water vapor and oxygen. This is achieved by first applying a vacuum to the annular space 20. One means of providing closed communication with the annular space is by the use of the circumferential bag 22. While the element 22 is referred to as "bag" or reservoir it is preferably of metallic material of an internal diameter at least equal to the internal diameter 10A of the tubular host. Bag 22 has a portion 22A. With the bag 22 in place a weld 24 is applied around the entire circumferential end 22D of the bag to seal it to the second end 10C of the host. A second weld 26 is then circumferentially applied to affix the bag to the external surface 14A of the cladding member. With the bag 22 thus welded in place closed communication is provided between the annular space 28 within the bag and the annular space 20 between the tubular host and the tubular cladding member.

A small diameter opening 30, which could be a pinch tube, is formed in bag 22 by which piping (not shown) may be attached.

By means of piping (not shown) the annular spaces 20 and 28 are subjected first to a vacuum to pull air from between the interior surface 10A of the host member and the exterior surface 14A of the cladding member.

Next, an inert gas, such as argon, is injected through the opening 30 to enter in and fill the annular space 20.

It is imperative that the annular space 20 between the interior surface of the host pipe and the exterior surface of the cladding member be substantially free of water and oxygen. By "substantially free" is meant that the space should be under conditions such that the water and oxygen dew point is at −60° F. or below. To achieve this result the space may have to be evacuated, filled with inert gas, evacuated and refilled several times. When the water and oxygen levels in the annular space have been reduced to the accepted level the pressure of inert gas remaining in the annular space can be relatively low and preferably is that which is sufficient to help support the bag, that is, resist collapsing of the bag, during the subsequent steps of heating and rolling the subassembly. At this step, a quantity, such as 5 wt. percent hydrogen may be added to the inert gas.

The host member with its inserted tubular cladding member 14 welded at 18 and with the bag 22 in position and welded at 24 and 26 forms a subassembly. After evacuation and filling the annular space 20 with an inert gas as above described, the subassembly is ready for the final stages of forming a cladded tubular member. The subassembly may now be returned to the mill and succeeding steps are employed as with a pierced billet completing the manufacture of a seamless tubular item. The subassembly is heated to a temperature at which bonding under pressure effectively occurs.

The essence of this invention is the application of liquid interface diffusion bonding to achieve metallic bonding of tubular products within the customary practices of hot rolling. LIDB requires temperatures above 1650° F., some contact pressure, and very clean conditions. The nickel base alloy can not be exposed to air above 2250° F. For this reason, the subassembly is heated to a temperature at which the bonding metal alloy 12 melts, which is in the range of about 1650° F. to 2100° F. When the bonding metal alloy is nickel phosphorus, the subassembly is heated to about 1950° F.

In the exemplary application of the invention wherein a cladded pipe is manufactured on a mandrel mill, a mandrel is inserted into the heated subassembly and pressure is applied between the tubular cladding member 14 and host member 10 to metallically bond the two materials together; that is, after the subassembly is heated to the required temperature. It is hot rolled by a bank of opposing rolls to metallically bond the cladding member 14 to the host member internal surface 10A. The host member is now internally clad. Thereafter, the clad tubular member is passed through the normal steps employed in manufacturing seamless pipe on a mandrel mill; that is, stretch reduced to provide the preselected internal and external diameters and lengths. Afterwhich the clad pipe is cut to length, straightened, inspected, heat treated and so forth.

The use of bag 22 greatly facilitates the practice of important steps in the invention; that is, the bag makes it easy to remove oxygen and water from the annular space 20 and to prevent the reintroduction of such contaminants during heating in a non-atmosphere controlled furnace and during rolling. Additionally, the bag will expand during rolling in such a manner as to accept all gases being displaced from between the faying surfaces. After the cladding step has been completed, portions of the tubular cladding member 14 extending beyond the ends of the tubular host, and the bag 22, will be cut off and discarded. Thus, the bag 22 will be used only one time. Bag 22 does not need to have the shape illustrated. It may be arcuate in cross-sectional configuration, or it may be of a truncated conical shape. All that is necessary is an apparatus suitable to the tasks already listed.

The invention provides a unique process for manufacturing cladded tubular products which facilitates the employment of the standard seamless tubular manufacturing processes in use in the world today. The only additional steps necessary in the process not employed on the typical mill is the removal of the pierced billet for internally plating, the insertion and welding of the cladding member at one end, affixing the bag at the other end and removal of oxygen and water from the annular space. The subassembly is then returned to the standard manufacturing process, is heated and thereafter treated in the normal way employed in the finishing steps of producing seamless tubular goods.

Rolling equipment such as a reeler may readily be substituted for the mandrel mill. The exact equipment selected will be at the convenience of the steel mill. For very large diameter sizes, it is anticipated that a close fitting mandrel, made of a metal possessing a much higher coefficient of thermal expansion than the host, a metal such as stainless steel, can be used to clad with no recourse to rolling. The trade-off would be only a matter of economics and all selections would require the essence of the invention.

The method above described may be practiced to internally bond a tubular host formed of a first nickel or steel alloy with a cladding member formed of a second nickel alloy, in which the host is converted into tubing by extrusion and not by rolling as is typical for steel seamless tubulars.

FIG. 2 shows a method of practicing the invention as has been described with reference to FIG. 1 but in which a modified gas bag configuration is employed. In this arrangement the cladding member 14 is cut to the same length as the host member 10. The gas bag 23 is in the shape of one-half of a toroid cut in a plane perpendicular the circular axis. The circumferential outer surface 23A is welded to the second end 10C of the host member and the circumferential inner surface 23B is welded to the cladding member second end 14C. A small diameter opening 30 is provided in the gas bag to receive piping by which vacuum may be applied to the annular spaces 20 and 28 and by which an inert gas may be injected into the spaces.

The bag 23 of FIG. 2 can be expeditiously applied in forming the subassembly and performs the same function as bag 22 performs in the subassembly shown in FIG. 1. The arrangement of FIG. 2 is advantageous for extrusion in that the reservoir capacity can be much less to greatly reduced length of subassembly and the cross-section is readily amendable to the geometry of the extrusion press ram. The arrangement of FIG. 2 is equally susceptible to automatic welding techniques.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of manufacturing an internally clad nickel alloy tubular product employing a nickel alloy tubular host having a first and a second end, comprising:
   (a) plating the internal surface of the tubular host which is formed of a first nickel alloy with a low melting point bonding metal alloy;
   (b) inserting a tubular cladding member which is formed of a second nickel alloy into the plated tubular host;
   (c) welding the ends of the cladding member and the tubular host to form a sealed subassembly;
   (d) evacuating the annular space between the exterior of said cladding member and the internal of said host member and changing it with inert gas in a manner to substantially remove all water and oxygen and to leave the annular space filled with the inert gas;
   (e) heating the subassembly to about 1,650° F. to about 2,200° F.; and
   (f) extruding the heated subassembly in a press to metallically bond the cladding member to the tubular host.

2. The method of manufacturing an internally clad nickel alloy tubular product according to claim 1 wherein the steps are carried out in conjunction with a standard hydraulic press method of manufacturing tubular products, steps (a) through (d) being added to the standard hydraulic press method.

3. The method of manufacturing an internally clad nickel alloy tubular product according to claim 1 wherein step (d) includes charging the evacuated annular space with argon.

4. The method of manufacturing an internally clad nickel alloy tubular product according to claim 1 wherein in step (a) said low melting point bonding metal alloy is nickel-phosphorus composed of about 88 to 98 percent by weight nickel and about 2 to 12 percent by weight phosphorus.

5. The method of manufacturing an internally clad nickel alloy tubular product according to claim 1 wherein step (a) includes submerging the tubular host in an electroless bath.

6. The method of manufacturing an internally clad nickel alloy tubular product according to claim 1 including the step of coating the exterior of the cladding member with a flux prior to step (b).

7. The method of manufacturing an internally clad nickel alloy tubular product according to claim 6 wherein the flux is composed essentially of cryolite.

8. The method of manufacturing an internally clad nickel alloy tubular product according to claim 1 wherein in step (a) the low melting point bonding metal alloy is composed of about 88 to 98 percent by weight nickel, about 2 to 12 percent by weight phosphorus and about 0.5 to 1 percent by weight boron.

9. The method of manufacturing an internally clad nickel alloy tubular product according to claim 1 wherein in step (a) the low melting point bonding metal alloy is composed of about 96 to 98 percent by weight nickel and about 2 to 4 percent by weight boron.

10. The method of manufacturing an internally clad nickel alloy tubular product according to claim 1 wherein step (c) includes circumferentially welding one end of the cladding member to one end of the tubular host and welding a circumferential bag between the second end of the tubular host and the tubular cladding member, the bag providing means to facilitate the performance of step (d).

11. The method of manufacturing an internally clad nickel alloy tubular product according to claim 10 wherein the tubular bag remains a part of the subassembly until the metallic bonding of the cladding member to the tubular host is completed.

12. The method of manufacturing an internally clad nickel alloy tubular product according to claim 1 in which, after step (f) the tubular host having the cladding member metallically bonded thereto is reduced by rolling or drawing to preselected OD and ID sizes.

13. The method of manufacturing an internally clad nickel alloy tubular product according to claim 1 wherein step (d) includes evacuating the annular space and charging it with an inert gas repeatedly until the oxygen and water level remaining within the annular space is below a level expressed by a dewpoint of about −60° F.

14. The method of manufacturing an internally clad nickel alloy tubular product according to claim 1 wherein in step (e) the subassembly is heated to about 1925° F.

15. The method of manufacturing an externally clad nickel alloy tubular product according to claim 1 wherein in step (a) the internal surface at the tubular host is plated with a low melting point bonding metal alloy selected from the group comprising nickel phosphorus, nickel boron, nickel chromium phosphorus, chromium phosphorus and mixtures thereof.

16. The method of manufacturing an internally clad nickel alloy tubular product according to claim 10 in which said tubular host and said tubular cladding member are of substantially the same length and in which said bag is in the substantial shape of one-half of a toroid cut in a plane perpendicular the circular axis providing an inner and an outer circumferential surface, the inner circumferential surface being welded to one end of said tubular cladding member and the outer circumferential surface being welded to one end of said tubular host member.

17. A method of manufacturing an internally clad tubular product employing a tubular host having a first and a second end, comprising:
   (a) plating the internal surface of the tubular host with a low melting point bonded metal alloy;
   (b) inserting a tubular cladding member into the plated tubular host the tubular cladding member having a first and second end, the tubular host and cladding member being of substantially the same length;
   (c) circumferentially welding the first end of said cladding member to the first end of said tubular host;
   (d) welding a circumferential bag between the second end of said tubular host and the second end of said tubular cladding member to form a sealed subassembly, the bag being in the substantial shape of one-half of a toroid cut in a plane perpendicular the circular axis providing an inner and outer circumferential surface, the inner circumferential surface being welded to the second end of said tubular cladding member and the outer circumferential surface being welded to the second end of said tubular host;
   (e) evacuating the annular space between the exterior of said cladding member and the interior of said host and charging it with inert gas by attachment of apparatus to said bag in a manner to substantially remove all water and oxygen;

(f) heating the subassembly from about 1,650° F. to about 2,200° F.; and (g) forming the heated subassembly in a mill to metallically bond the cladding member to the tubular host.

18. A method of manufacturing an internally clad tubular product employing a tubular host having a first and a second end and having a cylindrical faying surface and tubular cladding member having a first and a second end and having a cylindrical faying surface, comprising:

(a) plating one of the faying surfaces with a low melting point bonding metal alloy;

(b) assemblying the tubular members one within the other so that their faying surfaces are juxtaposed;

(c) circumferentially welding the first end of the tubular host to the first end of the tubular cladding member;

(d) welding a circumferential bag to the second end of the tubular host to the second end of the tubular cladding member, the bag being in the substantial shape of one-half of a toroid cut in a plane perpendicular the circular axis providing an inner and outer circumferential surface, the inner circumferential surface being welded to the second end of said tubular cladding member and the outer circumferential surface being welded to the second end of said tubular host;

(e) purging the annular space between the faying surfaces of oxygen and water by attachment of apparatus to said circumferential bag;

(f) heating the assembled members to the melting temperature of the bonding metal alloy; and (g) applying pressure between the assembled tubular members to bond the faying surfaces.

* * * * *